Dec. 16, 1924.
C. DINGLE
BEATER
Filed Feb. 19, 1923 — 2 Sheets-Sheet 1
1,519,533
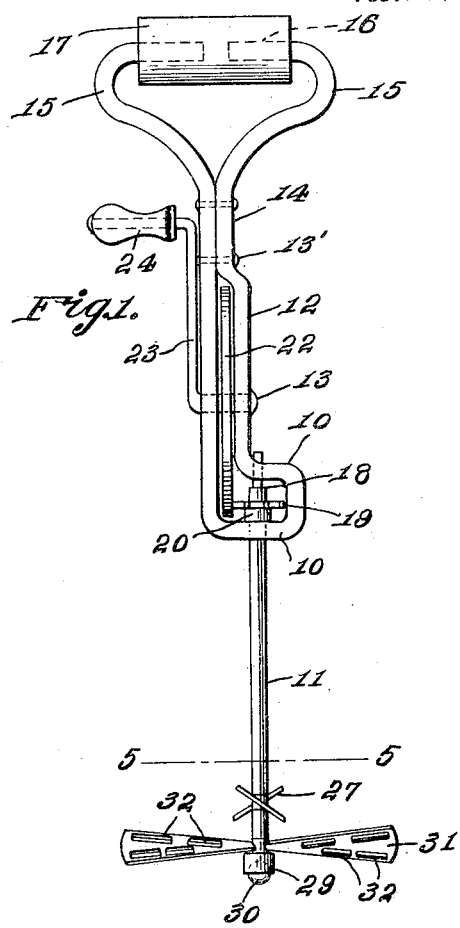
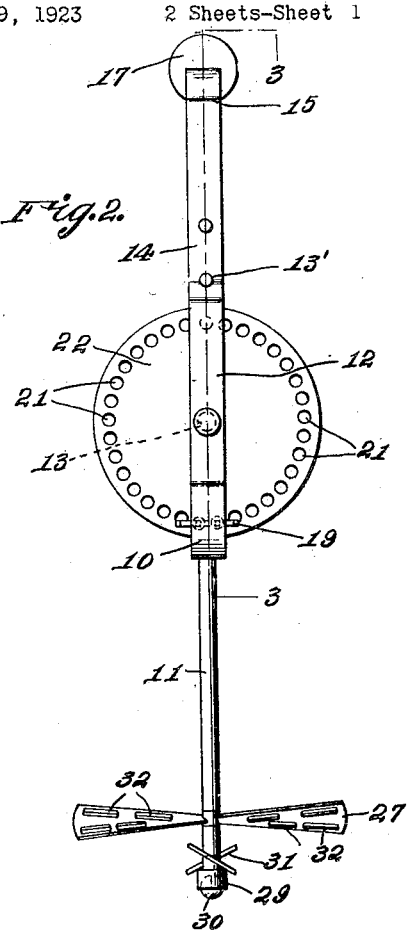
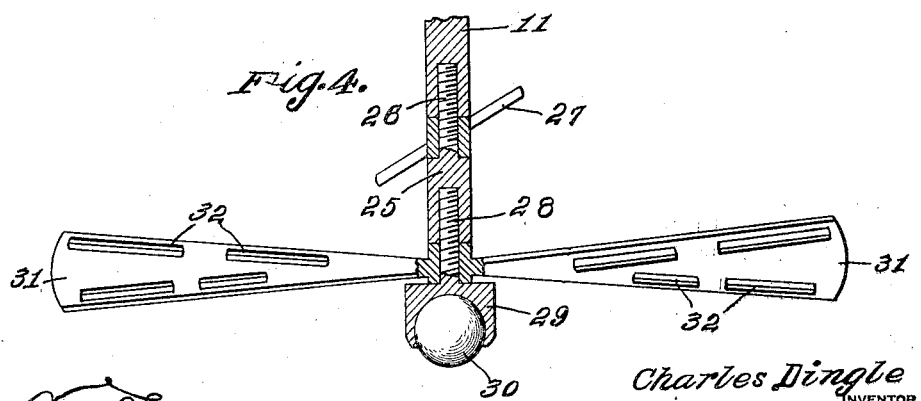
Charles Dingle
INVENTOR
BY Victor J. Evans
ATTORNEY
WITNESS:

Dec. 16, 1924.   1,519,533
C. DINGLE
BEATER
Filed Feb. 19, 1923   2 Sheets-Sheet 2

Charles Dingle INVENTOR
BY Victor J. Evans ATTORNEY

WITNESS:

Patented Dec. 16, 1924.

1,519,533

UNITED STATES PATENT OFFICE.

CHARLES DINGLE, OF FLORENCE, ARIZONA.

BEATER.

Application filed February 19, 1923. Serial No. 619,967.

*To all whom it may concern:*

Be it known that I, CHARLES DINGLE, a citizen of the United States, residing at Florence, in the county of Pinal and State of Arizona, have invented new and useful Improvements in Beaters, of which the following is a specification.

This invention relates to improvements in culinary implements and has especial relation to devices for beating eggs, cream and the like.

An object of the invention is the provision of a device of this character which includes a novel form of frame, constructed from a single strip of material and shaped to provide shaft bearings, gear housings and hand grip supporting means, the hand grip acting to connect the ends of the strip from which the frame is formed.

Another object of the invention is the provision of novel means for securing the beater blades in place, while a still further and important feature of the invention resides in the provision of a non-creeping means, whereby the beater will be prevented from creeping or sliding over the bottom of a disk or receptacle, when the beater is in use.

With the above and other objects in view, the invention further includes the following novel features and details of construction, to be hereinafter more fully described, illustrated in the accompanying drawings and pointed out in the appended claim.

In the drawings:—

Figure 1 is an elevation of a beater constructed in accordance with the invention.

Figure 2 is an elevation at right angles to Figure 1.

Figure 4 is an enlarged sectional view on the line 4—4 of Figure 1.

Figure 3:
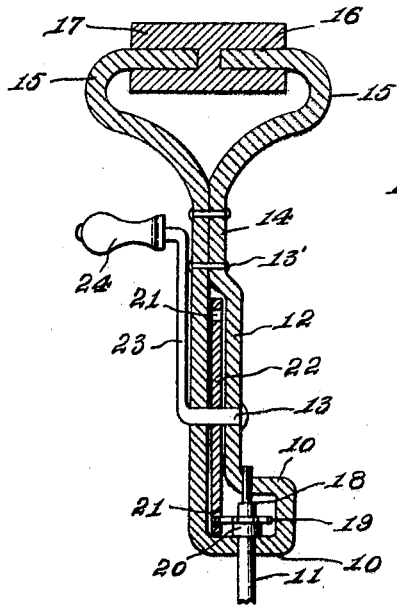
Figure 3 is a sectional view on the line 3—3 of Figure 2.
Figure 6:
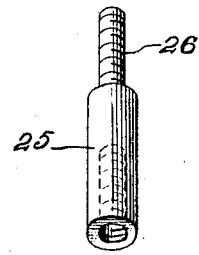
Figure 6 is a detail view of the detachable section of the driven shaft.
Figure 5:
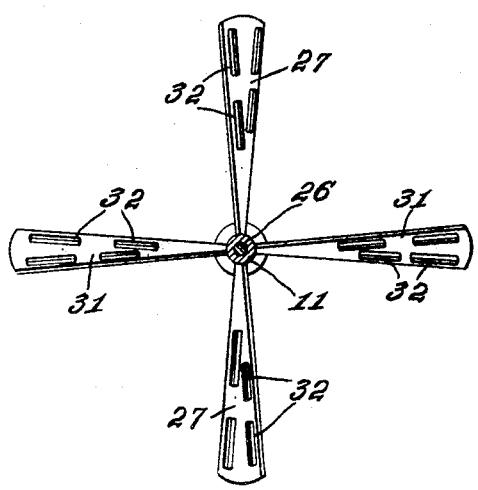
Figure 5 is a section on the line 5—5 of Figure 1.
Figure 7:
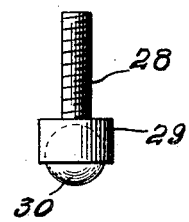
Figure 7 is a similar view showing the combined anti-creeping device and base clamp.

Referring in detail to the drawings, wherein like characters of reference denote corresponding parts, the invention is shown as comprising a frame, formed from a single strip of preferably flat metal and bent intermediate its ends to provide normally horizontally disposed spaced bearing members 10 which provide a bearing for a driven shaft 11. Extending from the bearing members 10 are vertically disposed spaced parallel bearing members 12 which provide bearings for the drive shaft 13, one of the bearing members 12 being bent inwardly so as to engage the other bearing member and riveted or otherwise secured together as shown at 13' so as to provide a shank 14. The material at the upper end of the shank 14 is bent outwardly as at 15 and inwardly to provide inwardly and outwardly extending extremities 16, which are adapted to enter the opposite ends of a hand grip 17. The extremities of the strip thus serve as a supporting or connecting means with the hand grip 17 while the latter serves to connect the opposite ends of the strip.

The upper end of the shaft 11 is reduced and enters an opening in the upper bearing member 10, the said reduced portion of the shaft 11 providing a shoulder 18 for engagement with the inner face of the upper bearing member 10. A pinion 19 is mounted upon the shaft 11 and located between this pinion and the lower bearing member 10 is a spacing collar 20. The teeth of the pinion 19 engage spaced openings 21 provided adjacent the edge of a disk 22 and this disk is secured upon a shaft 13, so that this shaft and the shaft 11 are geared together. Extending from the shaft 11 is a crank arm 23 whose outer end is provided with a handle or grip 24. Rotation of the shaft 13 will thus rotate the shaft 11.

The shaft 11 is of sectional formation and includes a section 25, the latter being provided with a threaded shank 26 which is adapted to engage a threaded socket provided in the lower end of the main section of the shaft 11. The threaded extension 26 is reduced so as to provide an annular shoulder which co-operates with the bottom of the main section of the shaft 11 to provide clamping means for a beater blade 27. The section 23 of the shaft 11 is provided in its lower end with a threaded socket for the reception of a screw 28, the latter being provided with a socketed head 29 within which is retained an anti-friction ball 30. This ball provides an anti-creeping device, the shaft 11 being capable of rotation without rotating the ball so that creeping movement of the device over the bottom of a receptacle will be prevented. In addition to providing means for holding the anti-creeping device, the screw 28 is utilized to secure a beater blade 31 to the bottom of the section 23 of the shaft 11.

The blades 27 and 31 are preferably provided with openings 32 which act to cut and mix the material, so that the length of time required for beating will be materially reduced.

The invention is susceptible of various changes in its form, proportions and minor details of construction and the right is herein reserved to make such changes as properly fall within the scope of the appended claim.

Having described the invention what is claimed is:—

In a beater, a blade shaft having fixed thereon a gear, a frame formed of a single piece of metal bent upon itself and having at its bight an offset portion housing said gear and also having at an intermediate point of its length a comparatively shallow housing portion and further having portions arranged against each other and fixedly connected together and terminating in aligned spindles, a hand grasp receiving said terminal spindles, a gear arranged in said shallow offset portion, and a crankshaft fixed to said gear and journaled in frame portions opposite the shallow offset portion.

In testimony whereof I affix my signature.

CHARLES DINGLE